United States Patent
Borlodan et al.

(10) Patent No.: US 11,326,374 B2
(45) Date of Patent: May 10, 2022

(54) OPERATING ARRANGEMENT FOR AT LEAST ONE MOTOR VEHICLE LATCH

(71) Applicant: Kiekert AG, Heiligenhaus (DE)

(72) Inventors: Stelian Borlodan, White Lake, MI (US); Mandya Rajagopal, Wixom, MI (US)

(73) Assignee: Kiekert AG, Heiligenhaus (DE)

( * ) Notice: Subject to any disclaimer, the term of this patent is extended or adjusted under 35 U.S.C. 154(b) by 642 days.

(21) Appl. No.: 16/228,969

(22) Filed: Dec. 21, 2018

(65) Prior Publication Data
US 2020/0199917 A1    Jun. 25, 2020

(51) Int. Cl.
| | |
|---|---|
| *E05B 81/16* | (2014.01) |
| *E05B 81/28* | (2014.01) |
| *E05C 9/04* | (2006.01) |
| *E05B 83/16* | (2014.01) |
| *E05B 47/06* | (2006.01) |
| *E05B 77/06* | (2014.01) |
| *E05B 81/90* | (2014.01) |

(52) U.S. Cl.
CPC .......... *E05B 81/16* (2013.01); *E05B 47/0657* (2013.01); *E05B 77/06* (2013.01); *E05B 81/28* (2013.01); *E05B 81/90* (2013.01); *E05B 83/16* (2013.01); *E05C 9/04* (2013.01)

(58) Field of Classification Search
CPC ..... B60J 7/141; B60J 7/1851; B62D 33/0273; E05B 81/16; E05B 81/28; E05B 83/16; E05C 9/04
USPC ......... 292/201, 216, DIG. 23, 44, 45, 49, 54
See application file for complete search history.

(56) References Cited

U.S. PATENT DOCUMENTS

| | | | | |
|---|---|---|---|---|
| 3,592,504 A | * | 7/1971 | Sandor | B60J 5/103 296/70 |
| 4,364,249 A | * | 12/1982 | Kleefeldt | E05B 77/48 292/144 |

(Continued)

FOREIGN PATENT DOCUMENTS

| | | | | |
|---|---|---|---|---|
| DE | 102014214269 A1 | | 2/2015 | |
| EP | 0798437 A1 | * | 10/1997 | ............. E05B 81/04 |
| EP | 3287578 A1 | * | 2/2018 | ......... E05B 17/0025 |

OTHER PUBLICATIONS

"Boom." Merriam-Webster.com Dictionary, Merriam-Webster, https://www.merriam-webster.com/dictionary/boom. Accessed Jun. 29, 2021. (Year: 2021).*

(Continued)

*Primary Examiner* — Kristina R Fulton
*Assistant Examiner* — Emily G. Brown
(74) *Attorney, Agent, or Firm* — Renner, Otto, Boisselle & Sklar, LLP

(57) ABSTRACT

An operating arrangement for at least one motor vehicle latch, in particular a flap operating arrangement for two motor vehicle flap latches placed at a distance from one another and provided with a drive train. Furthermore, a lever arrangement interacting with the drive train is provided. Moreover, there is provided at least one transmission attached to the lever arrangement to act upon the at least one motor vehicle latch. The lever arrangement has an operating lever to act upon the transmission and a locking lever that blocks the operating lever at least when in a "locked" position, wherein the drive train works upon the locking lever.

18 Claims, 3 Drawing Sheets

(56) References Cited

U.S. PATENT DOCUMENTS

Figure 1:
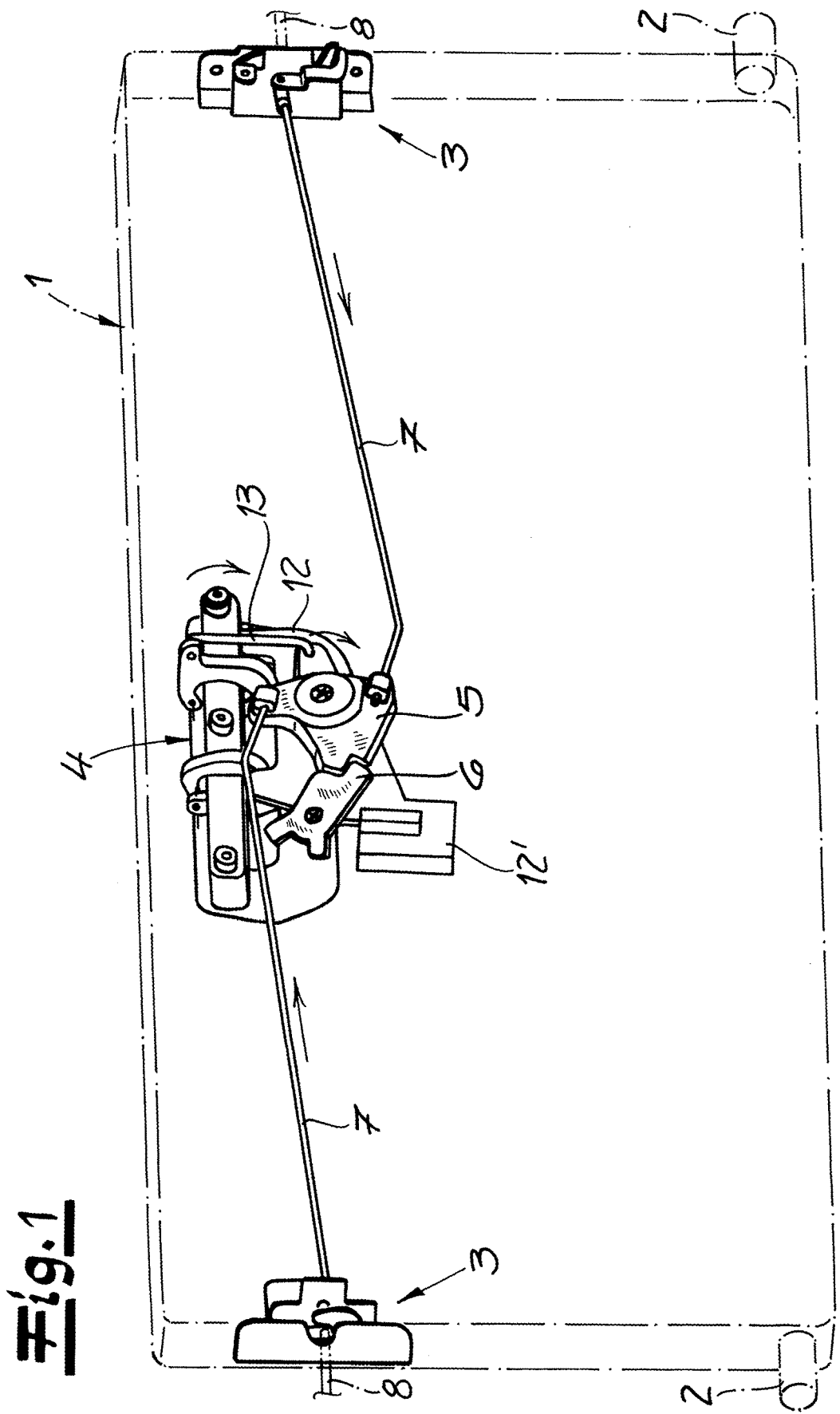

| | | | | |
|---|---|---|---|---|
| 4,494,782 | A * | 1/1985 | Lutz | E05B 81/25 |
| | | | | 292/96 |
| 5,183,310 | A * | 2/1993 | Shaughnessy | B62D 25/12 |
| | | | | 292/7 |
| 6,523,869 | B1 * | 2/2003 | Jensen | E05B 83/16 |
| | | | | 292/216 |
| 8,720,956 | B2 * | 5/2014 | Murray | E05B 79/20 |
| | | | | 292/48 |
| 8,903,605 | B2 * | 12/2014 | Bambenek | B62D 33/037 |
| | | | | 701/36 |
| 2010/0050714 | A1 | 3/2010 | Zagoroff | |

OTHER PUBLICATIONS

"Drivetrain." Merriam-Webster.com Dictionary, Merriam-Webster, https://www.merriam-webster.com/dictionary/drivetrain. Accessed Oct. 27, 2021. (Year: 2021).*

"Eccentric." Merriam-Webster.com Dictionary, Merriam-Webster, https://www.merriam-webster.com/dictionary/eccentric. Accessed Oct. 27, 2021. (Year: 2021).*

International Search Report dated Mar. 20, 2020, for corresponding International Patent Application No. PCT/IB2019/060691.

Written Opinion dated Mar. 20, 2020, for corresponding International Patent Application No. PCT/IB2019/060691.

* cited by examiner

OPERATING ARRANGEMENT FOR AT LEAST ONE MOTOR VEHICLE LATCH

The invention relates to an operating arrangement for at least one motor vehicle latch, in particular a (rear) flap operating arrangement for two motor vehicle flap latches placed at a distance from one another and provided with a drive train, furthermore with a lever arrangement interacting with the drive train and with at least one means of transmission attached to the lever arrangement to act upon the at least one motor vehicle latch.

Such operating arrangements are often but not exclusively used in so-called "pick-ups," i.e. motor vehicles with an open cargo area. For that purpose, two motor vehicle flap latches placed at a distance from one another are provided on the rear flap in question at edges across from one another. The two motor vehicle flap latches are acted upon by a central drive train attached to the rear flap in connection with a handle or a grip. The connection of the handle or grip provided at this site with the motor vehicle flap latches in question can involve the use of rods or cables. Details on this are described, for example, in US 2010/0050714 A1, showing an exemplary member of this category of operating arrangement.

The operating arrangement can be between an "unlocked" and a "locked" position with the drive train. As a result thereof, the two motor vehicle latches cannot, for example, be unlocked and opened with the handle when in the "locked" position. The "unlocked" position, on the other hand, corresponds to the fact that the two motor vehicle latches can be opened with the handle and the rear flap across from the motor vehicle body can thus also be swung out or away.

The state-of-the-art according to the category-defining US 2010/0050714 A1 has generally proven itself. However, with regard to the practical and concrete implementation, it has been noticed that the drive train first works on a locking lever, for example, over an operating connection; the locking lever in turn then acts upon a latch lever. Moreover, a further drive lever is provided, which is acted upon by the handle. This results in a complex embodiment that can lead to malfunctions. The invention is meant to resolve these issues.

A technical task of the invention is to further develop such an operating arrangement for at least one motor vehicle latch to make a constructively simple assembly with flawless functionality available.

To fulfill this technical task, the invention suggests, for a generic operating arrangement for at least one motor vehicle latch, that the drive train work on a locking lever, which blocks an operating lever to act upon the means of transmission at least when in the "locked" position.

The solution according to the invention initially draws on a structurally simplified operating arrangement. In fact, normally only the drive train and the lever arrangement, consisting of the previously mentioned locking lever and the operating lever, are provided. The invention measures work towards the same goal, with the drive train working on the locking lever, which blocks the operating lever as a further component of the lever arrangement to act upon the means of transmission when in the "locked" position. The blockade of the operating lever corresponds to the fact that a lever is normally also blocked as a further component of the operating arrangement, or rather, performs a return stroke.

In general, the handle works upon the operating lever and, when the operating arrangement is in the "unlocked" position, ensures that the at least one motor vehicle latch can be opened through the means of transmission attached to the lever arrangement. One means of transmission can be attached to the lever arrangement; however, several means of transmission can also be attached to the lever arrangement. The operating arrangement is preferably used for the rear flaps described above with two latches and have two means of transmission attached to the lever arrangement, which means of transmission are each attached to different motor vehicle latches. If, on the other hand, the operating arrangement moves into the "locked" position, according to the invention, the drive train ensures that the locking lever is blocked. When in the "locked" position, the locking lever ensures that the operating lever to act upon the means of transmission is blocked. As a result thereof, the handle also cannot act so that one or usually both motor vehicle latches can be opened.

In this way, an operating arrangement for at least one motor vehicle latch is made available, which arrangement is particularly suitable as a rear flap operating arrangement on a rear flap of a motor vehicle. In this regard, the invention draws on exceedingly few components so that a simple manufacture and assembly are guaranteed. All of this can be successfully performed in consideration of a simultaneously adequate assembly. The essential advantages can be seen herein.

To block the operating lever with the locking lever in detail, the locking lever and/or the operating lever generally have a blockade contour, i.e. the locking lever, the operating lever or both levers can have such a blockade contour. In most cases, it is provided that both the locking lever and the operating lever are each provided with a blockade contour. Both blockade contours on the locking lever and the operating lever correspond to one another and thus are provided so that, when the operating arrangement is in the "locked" position, they interlock solidly. In most cases, when the operating arrangement is in the "locked" position, there is both a solid and exceedingly form-fitting interaction between the two blockade contours on the one hand at the locking lever and on the other hand at the operating lever.

Moreover, it has proven itself in this regard when the locking lever and the operating lever are mounted on a mutual base plate. The locking lever and the operating lever can be mounted on the base plate in question such that the levers in question are detachably mounted on the base plate. Here, a ratchet connection or ratchet rotating connection has proven to be suitable, which allows for particularly simple and fast and thus cost-efficient mounting.

The previously mentioned base plate to mount the locking lever as well as the operating lever is, in most cases, also used to mount the drive train and is provided for accordingly. The base plate can essentially be made of plastic. This is not, however, necessary. In any case, the base plate normally has mounts as well as possibly a housing-like molding, which is suitable and provided for to accommodate the drive train. The drive train, as such, is usually a linear actuator or a correspondingly linearly operating actuator.

The drive train or the linear actuator works on the locking lever. For that purpose, the drive train is typically attached to the locking lever. In most cases, a rotating joint connection between a threaded member as a component of the drive train or the linear actuator on the one hand and the locking lever on the other hand is provided for that purpose. Linear motions of the threaded member then lead to the locking lever swiveling in relation to the base plate. By this swiveling motion the locking lever is shifted between the "locked" position and the "unlocked" position. When the operating arrangement or the locking lever is in the "locked" position, the locking lever ensures that the operating lever is blocked. The handle acting upon or attached to the operating lever thus goes into neutral with relation to the at least one motor vehicle latch or is blocked. The motor vehicle latch or the two motor vehicle flap latches usually placed at a distance from one another thus cannot be opened.

The previously mentioned handle is attached to the lever arrangement. In most cases, the handle is designed as a (rear) flap handle. The handle can then be mounted in or on a flap, in most cases the rear flap. For that purpose, the handle usually works with the help of a transmission element on the lever arrangement. The transmission element is advantageously a connection rod or in general an operating rod.

As previously explained, two means of transmission to act upon two motor vehicle latches located across from one another are preferably attached to the operating lever. The two means of transmission are thus advantageously attached to the operating lever eccentrically. As a result thereof, rotation of the operating lever leads in particular to the two means of transmission in the "unlocked" position being acted upon by pulling so that the motor vehicle latch provided for at the end of the means of transmission can be opened as desired over the corresponding pulling action. If, on the other hand, the operating arrangement is in the "locked" position, the operating lever cannot be rotated and thus the two motor vehicle latches also cannot be opened, because the operating lever is, in this case, blocked by the locking lever.

The changed of the operating arrangement from the "unlocked" position to the "locked" position and back can take place and be implemented in a variety of ways. For example, the drive train, equipped with an electric motor drive or electric motor, can be moved into the "unlocked" or "locked" position using a switch mounted in the vehicle, e.g. on the instrument panel. Of course, remote threadedling of the drive train is also possible, for example, using a remote key or other measures, e.g. a cell phone, and this is within the scope of the invention. In one way or another, the operating arrangement can at least be moved into the "unlocked" and "locked" positions with the drive train.

The invention will be explained in greater detail below using a drawing representing only one exemplary embodiment.

Figure 2:
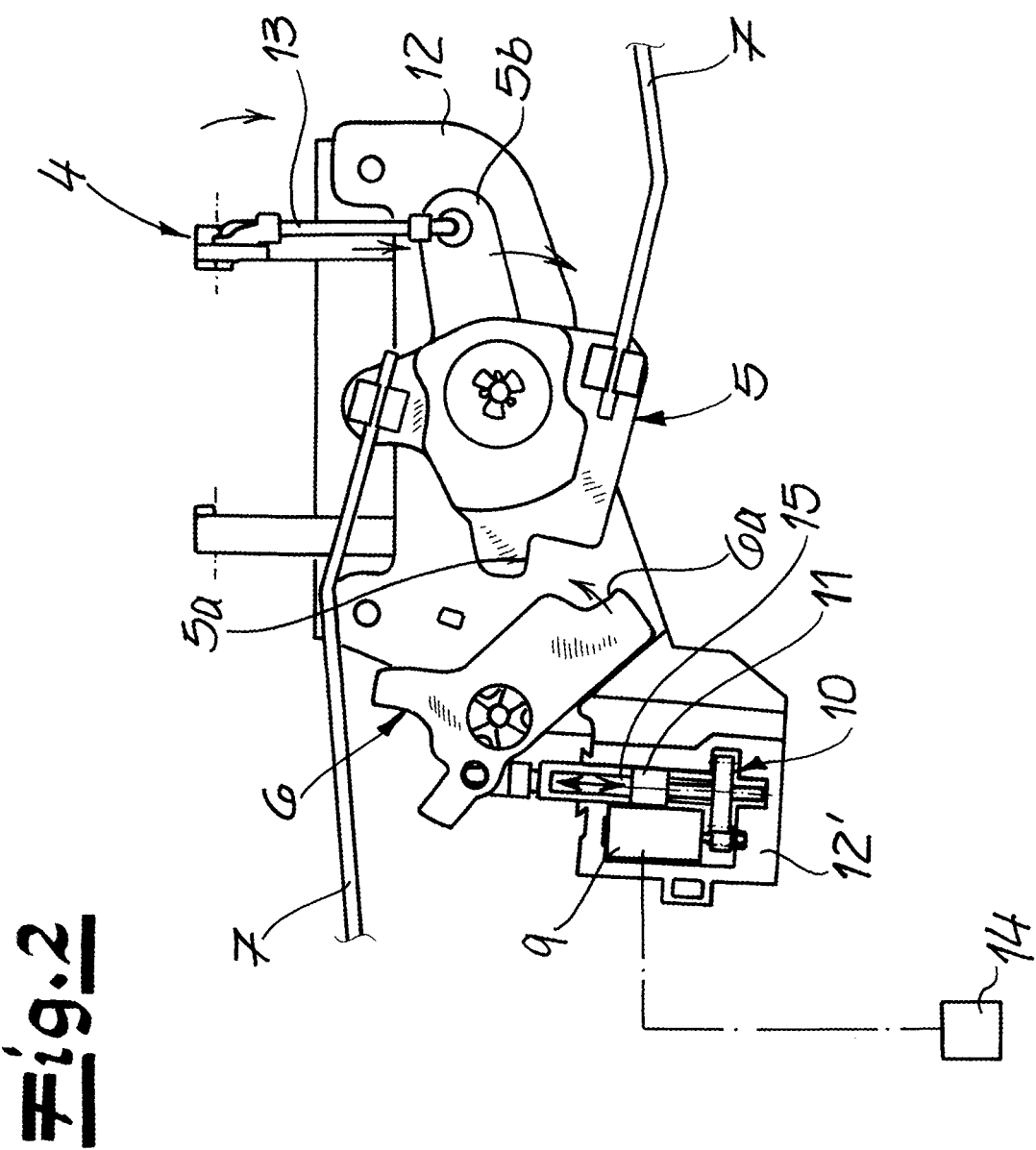
Figure 3:
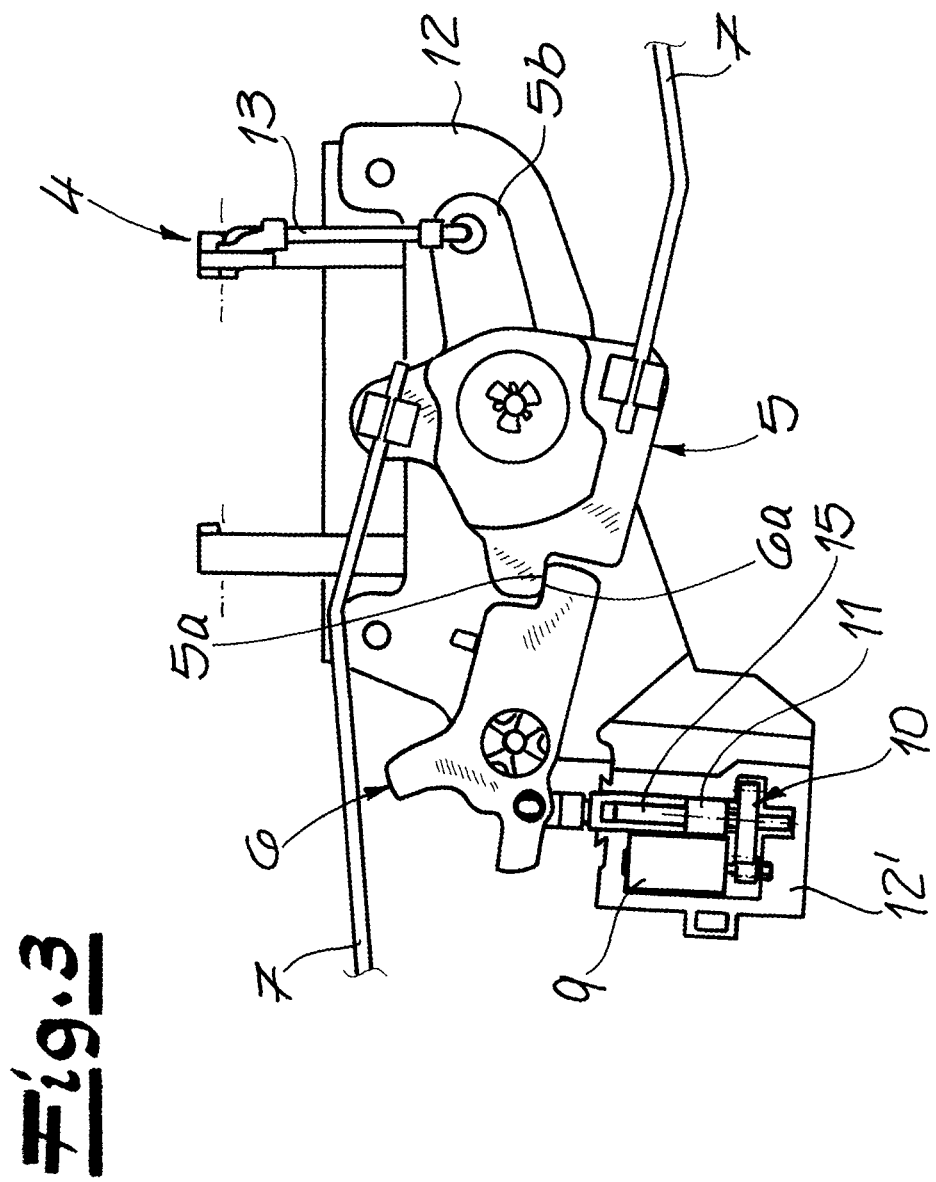

FIG. 1 shows a schematic view of a rear flap in an overview along with the operating arrangement according to the invention as well as the motor vehicle latches provided for in this regard, FIG. 2 shows the operating arrangement in the "unlocked" position reduced to the components essential to the invention and FIG. 3 shows the subject matter according to FIG. 2 in the "locked" position.

In FIG. 1 is represented generally and in an overview an operating arrangement on the rear flap 1. The rear flap 1 is part of a so-called "pick-up" and is, for that purpose, attached rotatably to an open cargo area of said motor vehicle with bilateral lower bearing pins 2. To lock the rear flap 1 across from the motor vehicle body, the rear flap 1 is provided, according to the exemplary embodiment, with two motor vehicle latches 3 located across from one another and only suggested in FIG. 1. The two motor vehicle latches 3 are placed at a distance from one another and are located across from one another according to the exemplary embodiment. The rear flap 1 across from the motor vehicle body is locked and unlocked with the two motor vehicle latches 3, which are designed as motor vehicle flap latches 3.

The operating arrangement comprises a drive train with an electric motor 9 and a transmission arrangement 10 acted upon by the electric motor 9 with a screw spindle 15 and a threaded member 11, a lever arrangement interacting with the drive train and two means of transmission 7, each of which act upon one of the two motor vehicle latches 3. The lever arrangement has an operating lever 5 to act upon the means of transmission 7 and a locking lever 6, which blocks the operating lever at least when it is in the "locked" position.

When the operating arrangement is in the "unlocked" position, the rear flap 1 can be opened with a handle 4. For that purpose, the handle 4 may be attached rotatably to the rear flap 1. A corresponding swiveling motion of the handle 4 around a horizontal axis, suggested in FIG. 1, then leads to the operating arrangement opening the motor vehicle latches 3 through the two means of transmission 7 attached to the lever arrangement. The two means of transmission 7 are, according to the exemplary embodiment but not restrictively, transmission rods. In principle, other means of transmission can also be used at this site, e.g. cables and other combinations. In any case, the action upon the handle 4, according to the swiveling motion represented and suggested in FIG. 1, ensures that the operating lever 5 performs a clockwise motion around its axis, also suggested in FIG. 1.

Since the two means of transmission or transmission rods 7 are each attached eccentrically to the operating lever 5 according to the exemplary embodiment, this clockwise motion of the operating lever 5, when the operating arrangement is in the "unlocked" position, leads to the means of transmission or transmission rods 7 being acted upon with a pulling motion also suggested in FIG. 1. The pulling motion of the means of transmission or transmission rods 7, visualized in FIG. 1 with an arrow, leads to the correspondingly acted upon motor vehicle latch 3 being opened. In this exemplary embodiment this is because the pulling motion of the means of transmission 7 leads to a pawl, as a component of a locking mechanism constituted of a catch and pawl, being raised from its resting interaction with the catch. As a result thereof, the catch of the motor vehicle latch 3 comes free and thus so does the rear flap 1 of each locking pin 8 on the motor vehicle body also suggested in FIG. 1. The rear flap 1 can thus be swung up or down.

The drive train, which can be seen best in FIGS. 2 and 3, is designed, according to the exemplary embodiment, as a linear actuator or a linearly operating actuator. Rotating motions of the electric motor 9 and thus of the transmission arrangement 10 rotate the screw spindle 15. A rotation of the screw spindle 15 is converted, via interaction with a thread on the threaded member 11, into a linear actuation of the screw spindle 15 on the output side as a component of the drive train 9, 10, 11, which are suggested in FIG. 2 by a double arrow. The linear actuations of the screw spindle 15 of the drive train located on the output side are transformed into rotating motions of the locking lever 6. Furthermore, the screw spindle 15 is connected to the locking lever 6 with a rotating joint. Moreover, the locking lever 6 is also attached rotatably to a base plate 12, as is the operating lever 5.

According to the exemplary embodiment, both levers 5, 6 are detachably coupled with a ratchet connection or ratchet rotating connection to the base plate 12 in question, which, in the exemplary embodiment, is or can be manufactured using plastic, i.e. the two levers 5, 6 can be coupled to the base plate 12 in question with a combination of inserting, locking and, if necessary, rotating motions. With the help of FIGS. 2 and 3, it can be recognized that the two means of transmission 7 or transmission rods are attached to the operating lever 5 with jointed insertion connections, eccentrically in comparison with its axis of rotation. Moreover, according to the exemplary embodiment, the operating lever 5 is designed with a boom 5b to which is attached a further transmission element 13. According to the exemplary embodiment, the transmission element 13 is also a rod or transmission rod.

Pivoting motions of the handle 4 mounted rotatably on the rear flap 1 are finally performed on the operating lever 5 with the transmission element 13. Pivoting motions of the handle 4 around its axis of rotation, suggested in FIG. 1 with an arrow motion, parallel to the rear flap 1 leads, according to FIG. 2, to the transmission element 13 or the transmission rod there being moved in the indicated arrow direction downwards when in the "unlocked" position. This results in the operating lever 5 performing a clockwise motion also suggested in FIG. 2 around its axis.

In the "unlocked" position of the operating arrangement represented in FIG. 2, the operating lever 5 can perform the clockwise motion around its axis initiated with the help of the handle 4, because the operating lever 5 is free of the locking lever 6 when it is in the "unlocked" position of the operating arrangement. As a result of the clockwise motion of the operating lever 5 corresponding to the "unlocked" representation in FIG. 2, the two means of transmission 7 or transmission rods are each acted upon with a pull in the arrow direction suggested in FIG. 1 and ensure, at the end in the attached motor vehicle latches, that the respective pawl is raised from its interaction with the catch, for example. This has already been explained above. As a result thereof, the concerned motor vehicle latch 3 releases the locking bolt or locking pin 8 on the motor vehicle body and thus the rear flap 1 across from the motor vehicle body can be up or down.

To move the operating arrangement into the "locked" position shown in FIG. 3, on the other hand, first the drive train, starting in the "unlocked" position in FIG. 2, must be acted upon so that the screw spindle 15 is moved "downwards." As a result of the downward motion of the screw spindle 15, the locking lever 6, attached to the screw spindle 15 with a pivot joint, is moved counterclockwise around its axis, starting in the position corresponding to the representation in FIG. 2. The result of this is that the locking lever 6 blocks the operating lever 5 that acts upon the respective means of transmission 7 when the operating arrangement is in a "locked" position.

For that purpose, both the locking lever 6 and the operating lever 5 each feature the detail of having blockade contours 6a and 5a, respectively. The concerned blockade contours 6a and 5a are each a right angle contour. Moreover, the design is such that the two blockade contours 5a, 6a correspond to one another, i.e. in the "locked" position corresponding to the representation in FIG. 3, have a force-locking connection to one another. In fact, the two blockade contours 5a, 6a even interlock solidly and exceedingly form-fittingly. As a result thereof, the operating lever 5, starting in the "locked" position corresponding to FIG. 3, cannot (any longer) perform a clockwise motion around its axis to open the two motor vehicle latches 3. To that effect, the handle 4 is also blocked according to the exemplary embodiment. In principle, the handle 4 can also be designed so that an idle stroke occurs when the operating arrangement is in the "locked" position.

To act upon the locking unit, this may be attached to a controller 14 only suggested in FIG. 2. The controller 14 is, in turn, controlled with, for example, a switch provided within the motor vehicle, a remote threaded or by other means so that the drive train 9, 10, 11 is acted upon over the controller 14 to assume the desired "unlocked" or "locked" position. The drive train is accommodated and kept in a housing-like molding of the base plate. Individual housing is thus unnecessary.

As previously explained, the base plate 12 can be advantageously manufactured of plastic. This is similar for the two levers 5, 6. With a base plate 12 design using plastic, it is possible, moreover, to create individual openings or a housing replica 12' in or on this base plate 12, serving to accommodate the drive train. With this housing replica 12', the base plate 12 is also capable and designed to mount the drive train. The two means of transmission or transmission rods 7, on the other hand, are also designed as metal rods, just like the transmission element or the transmission rod 13. The means of transport 7 in question and also the transmission element 13 are each hooked in the operating lever 5, which thus not only ensures the mechanical coupling with the handle 4 and is designed for this purpose, but at the same time acts upon the two motor vehicle latches 3 placed at a distance from one another over the means of transmission or the transmission rods 7.

REFERENCE LIST

Rear flap 1
Bearing pin 2
Motor vehicle latch 3
Handle 4
Operating lever 5
Locking lever 6
Boom 5b
Blockade contour 6a, 5a
Means of transmission 7
Locking pin 8
Electric motor 9
Transmission arrangement 10
Threaded member 11
Base plate 12
Housing replica 12'
Transmission element 13
Controller 14
Screw Spindle 15

The invention claimed is:

1. An operating arrangement for at least one motor vehicle latch, the operating arrangement comprising:
   a drive train that is configured to move the operating arrangement into an unlocked position and a locked position;
   a lever arrangement interacting with the drive train; and
   a transmission element attached to the lever arrangement to act upon the at least one motor vehicle latch, wherein the lever arrangement has a locking lever and an operating lever that is configured to act on the transmission element, wherein each of the locking lever and the operating lever are rotatable,
   wherein when the operating arrangement is in the locked position, the locking lever is acted on by the drive train to rotate into a position in which the locking lever blocks rotation of the operating lever,
   wherein both the locking lever and the operating lever have a blockade contour that correspond to one another, and
   wherein the locking lever and the operating lever are mounted on a mutual base plate in a same plane.

2. The operating arrangement according to claim 1, wherein the drive train is mounted to the base plate.

3. The operating arrangement according to claim 1, further comprising a rear flap handle which is attached to the lever arrangement.

4. The operating arrangement according to claim 3, wherein the handle acts upon the lever arrangement via the transmission element.

5. The operating arrangement according to claim 3, wherein the rear flap handle is rotatably attached to a rear flap.

6. The operating arrangement according to claim 1, wherein the lever arrangement is formed only of the locking lever and the operating lever.

7. The operating arrangement according to claim 1, wherein the drive train is attached to the locking lever and the transmission element is attached to the operating lever.

8. The operating arrangement according to claim 1, wherein the transmission element includes two transmission rods that act upon two motor vehicle latches located across from one another, wherein the two transmission rods are each eccentrically mounted on the operating lever and offset relative to each other.

9. The operating arrangement according to claim 8, further comprising a further transmission element, wherein the operating lever includes a boom which is attached to the further transmission element.

10. The operating arrangement according to claim 1, wherein the blockade contours interlock in a form-fitting manner.

11. The operating arrangement according to claim 1, wherein the blockade contours each have a right angle.

12. The operating arrangement according to claim 1, wherein the base plate, the operating lever, and the locking lever are formed of a plastic material.

13. The operating arrangement according to claim 1, wherein the locking lever and the operating lever are detachably mounted on the base plate.

14. The operating arrangement according to claim 1, further comprising a rotating joint connection between the drive train and the locking lever, whereby the locking lever is configured to swivel about the base plate.

15. The operating arrangement according to claim 1 further comprising a controller that is in communication with the drive train for moving the operating arrangement into the unlocked position or the locked position.

16. The operating arrangement according to claim 1, wherein the drive train is a linear actuator.

17. The operating arrangement according to claim 16, wherein the drive train includes an electric motor, a screw spindle, and a threaded member, wherein a linear movement of the screw spindle is transferred into rotary motion of the locking lever.

18. The operating arrangement according to claim 1, wherein the locking lever and the operating lever are arranged in a non-overlapping manner.

* * * * *